United States Patent
Carmichael et al.

(10) Patent No.: US 9,745,388 B2
(45) Date of Patent: Aug. 29, 2017

(54) BUTYL RUBBER WITH INCREASED IMPERMEABILITY

(71) Applicants: LANXESS Butyl PTE. LTD., Singapore (SG); The University of Windsor, Windsor (CA)

(72) Inventors: Tricia Breen Carmichael, Windsor (CA); Akhil Vohra, Windsor (CA); Lorenzo Ferrari, Burlington (CA); Natalie Suhan, London (CA)

(73) Assignees: LANXESS, Inc., Sarnia, CA (US); The University of Windsor, Windsor, CA (US)

( * ) Notice: Subject to any disclaimer, the term of this patent is extended or adjusted under 35 U.S.C. 154(b) by 50 days.

(21) Appl. No.: 14/651,478

(22) PCT Filed: Dec. 16, 2013

(86) PCT No.: PCT/CA2013/001047
§ 371 (c)(1),
(2) Date: Jun. 11, 2015

(87) PCT Pub. No.: WO2014/094123
PCT Pub. Date: Jun. 26, 2014

(65) Prior Publication Data
US 2015/0329649 A1    Nov. 19, 2015

Related U.S. Application Data

(60) Provisional application No. 61/738,681, filed on Dec. 18, 2012.

(51) Int. Cl.
C08C 19/25    (2006.01)
C08L 23/22    (2006.01)

(52) U.S. Cl.
CPC .............. *C08C 19/25* (2013.01); *C08L 23/22* (2013.01)

(58) Field of Classification Search
CPC ................................. C08C 19/25; C08L 23/22
USPC ............................................. 525/333.1, 342
See application file for complete search history.

(56) References Cited

U.S. PATENT DOCUMENTS

| | | | |
|---|---|---|---|
| 2,356,128 | A | 8/1944 | Thomas et al. |
| 5,476,121 | A | 12/1995 | Yoshikawa et al. |
| 7,576,155 | B2 | 8/2009 | Wang et al. |
| 7,915,333 | B2 | 3/2011 | Resendes et al. |
| 9,388,258 | B2 | 7/2016 | Davidson et al. |
| 2004/0087704 | A1 | 5/2004 | Jones et al. |
| 2009/0182087 | A1 | 7/2009 | Fudemoto et al. |
| 2011/0015303 | A1 | 1/2011 | Joseph et al. |
| 2011/0250372 | A1 | 10/2011 | Weng et al. |

FOREIGN PATENT DOCUMENTS

| | | |
|---|---|---|
| JP | 7130586 A2 | 5/1995 |
| JP | 9053767 A2 | 2/1997 |
| JP | 10298359 A2 | 11/1998 |

OTHER PUBLICATIONS

Fergusson et al., Macromolecules 26 (1993) 5870-5875.*
Silver et al., Biomaterials 20 (1999) 1533-1543.*
Elvers, B. et al., Rubber, 3, Synthetic, Ullmann's Encyclopedia of Industrial Chemistry, Fifth Edition, vol. A23: Refractory Ceramics to Silicon Carbide, VCH Verlag, 1993, Weinheim, Germany, pp. 288-295.
Morton, Maurice, Butyl and Halobutyl Rubbers, Rubber Technology, Third Edition, Van Nostrand Reinhold Company, New York, New York, 1987, pp. 297-300.
Parent, J. Scott, et al., "Ion-Dipole Interaction Effects in Isobutylene-based Ammonium Bromide Ionomers", Journal of Polymer Science Part A: Polymer Chemistry, vol. 43, Wiley Periodicals, Inc., 2005, pp. 5671-5679.
Parent, J. Scott, et al., Isobutylene-based ionomer composites: siliceous filler reinforcement, Polymer 45, Elsevier, 2004, pp. 8091-8096.
Parent, J. Scott, et al., "Synthesis and Characterization of Isobutylene-Based Ammonium and Phosphonium Bromide Ionomers", Macromolecules, American Chemical Society, 2004, pp. 7477-7483.
Compsites, Fabrication to Die Design, vol. 4, Compounding, Encyclopedia of Polymer Science and Engineering, John Wiley & Sons, New York, New York, 1986, pp. 66-79.
Chaudhury, Manoj K., "Self-assembled monolayers on polymer surfaces", Biosensors & Bioelectronics 10, Elsevier Science Ltd., 1995, pp. 785-788.
Ozcam, Ali E. et al., "Modification of PET surfaces with self-assembled monolayers of organosilane precursors", Journal of Electron Spectroscopy and Related Phenomena 172, Elsevier, 2009, pp. 95-103.
Adamkiewicz, Malgorzata et al., "A vapor phase depostiion of self-assembled monolayers: Vinyl-terminated films of volatile silanes on silicon oxide substrates", Thin Solid Films 520, Elsevier, 2012, pp. 6719-6723.
International Search Report from International Application No. PCT/CA2013/001047, dated Mar. 5, 2014, three pages.
Supplementary European Search Report from European Application No. 13866137, dated Jun. 20, 2016, three pages.

\* cited by examiner

*Primary Examiner* — Roberto Rabago (57) ABSTRACT

Surface modification methods based on a combination of plasma and chemical treatments render an unfilled butyl rubber surface highly reactive toward organosilanes, allowing formation of an organosilane self-assembled monolayer (SAM). Plasma oxidation of the butyl rubber surface followed by vapor deposition of $SiCl_4$ produces a hydrophilic surface suitable for anchoring organosilanes. Fabrication of SAMs on this hydrophilic butyl rubber surface with n-octadecyltrichlorosilane (OTS) and trichloro(1H,1H,2H,2H-perfluorooctyl)silane (FOTS) via vapor deposition resulted in a 15% and 25% decrease in gas permeability, respectively, with no change in optical transparency of the butyl rubber.

20 Claims, 8 Drawing Sheets

BUTYL RUBBER WITH INCREASED IMPERMEABILITY

FIELD OF THE INVENTION

The present invention relates to butyl rubber having a surface treatment that imparts increased impermeability. More particularly, the present invention relates to butyl rubber comprising a monomer with a pendant vinyl group. Even more particularly, the present invention relates to butyl rubber exhibiting optical transparency that is optionally unfilled. Processes for making the surface treated butyl rubber are also disclosed.

BACKGROUND

Poly(isobutylene-co-isoprene), or IIR, is a synthetic elastomer commonly known as butyl rubber which has been prepared since the 1940's through the random cationic copolymerization of isobutylene with small amounts of isoprene (1-2 mole %). As a result of its molecular structure, IIR possesses good air impermeability, a high loss modulus, oxidative stability and extended fatigue resistance.

Butyl rubber is understood to be a copolymer of an isoolefin and one or more, preferably conjugated, multiolefins as comonomers. Commercial butyl comprises a major portion of isoolefin and a minor amount, usually not more than 2.5 mol %, of a conjugated multiolefin. Butyl rubber or butyl polymer is generally prepared in a slurry process using methyl chloride as a diluent and a Friedel-Crafts catalyst as part of the polymerization initiator. This process is further described in U.S. Pat. No. 2,356,128 and Ullmanns Encyclopedia of Industrial Chemistry, volume A 23, 1993, pages 288-295.

Halogenation of this butyl rubber produces reactive allylic halide functionality within the elastomer. Conventional butyl rubber halogenation processes are described in, for example, Ullmann's Encyclopedia of Industrial Chemistry (Fifth, catalyst as part of the polymerization initiator. This process is further described in U.S. Pat. No. 2,356,128 and Ullmanns Encyclopedia of Industrial Chemistry, volume A 23, 1993, pages 288-295.

Halogenation of this butyl rubber produces reactive allylic halide functionality within the elastomer. Conventional butyl rubber halogenation processes are described in, for example, Ullmann's Encyclopedia of Industrial Chemistry (Fifth, Completely Revised Edition, Volume A231 Editors Elvers, et al.) and/or "Rubber Technology" (Third Edition) by Maurice Morton, Chapter 10 (Van Nostrand Reinhold Company © 1987), particularly pp. 297-300.

The presence of allylic halide functionalities allows for nucleophilic alkylation reactions. It has been shown that treatment of brominated butyl rubber (BIIR) with nitrogen and/or phosphorus based nucleophiles, in the solid state, leads to the generation of IIR-based ionomers with interesting physical and chemical properties (see: Parent, J. S.; Liskova, A.; Whitney, R. A; Resendes, R. *Journal of Polymer Science, Part A*: Polymer Chemistry 43, 5671-5679, 2005; Parent, J. S.; Liskova, A.; Resendes, R. *Polymer* 45, 8091-8096, 2004; Parent, J. S.; Penciu, A.; Guillen-Castellanos, S. A.; Liskova, A.; Whitney, R. A. *Macromolecules* 37, 7477-7483, 2004). The ionomer functionality is generated from the reaction of a nitrogen or phosphorus based nucleophile and the allylic halide sites in the halogenated butyl rubber to produce an ammonium or phosphonium ionic group, respectively. The physical properties of these halogenated butyl rubber based ionomers, such as green strength, modulus, filler interactions etc., are superior to those of their non-ionomeric counterpart.

Improvement of the air impermeability while still retaining other desired properties (e.g., tensile strength, hardness, etc.) remains important. For example, fields such as aerospace, aircraft, and high-vacuum systems have extremely high gas barrier requirements that are difficult or impossible to meet with current IIR technology while retaining desired physical properties. Although fillers can be used

SUMMARY OF THE INVENTION

Figure 1:
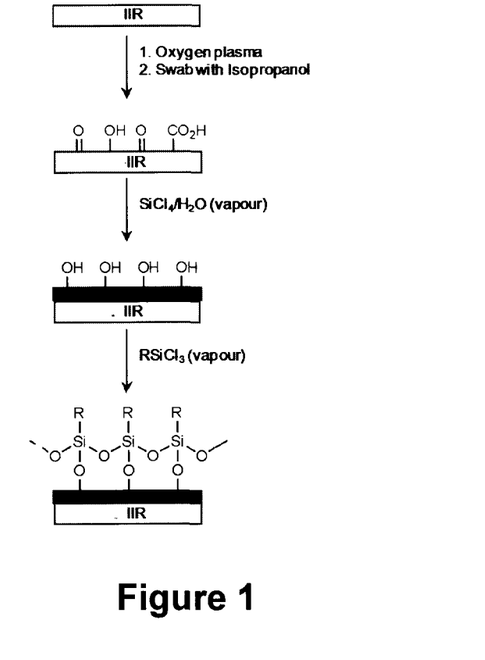
FIG. 1 shows a schematic illustration of the surface modification of butyl rubber and subsequent formation of an organosilane SAM (self-assembled monolayer)

Herein is described a simple, effective surface modification method based on a combination of plasma and chemical treatment that renders the IIR surface highly reactive toward organosilanes, enabling the formation of a perfluorinated organosilane self-assembled monolayer (SAM) that increases the impermeability of IIR to oxygen (FIG. 1). There are two important advantages of this method to improve the air impermeability of butyl rubber compared to the commonly used method of adding fillers to the IIR formulation: First, the material modification that improves the impermeability is restricted to the surface of the IIR substrate, which leaves desirable bulk properties such as tensile strength, hardness etc., substantially unchanged. Second, this method does not significantly compromise the optical transparency of transparent IIR formulations, whereas fillers often render these materials opaque.

According to an aspect of the present invention, there is provided a butyl rubber composition comprising repeating units derived from at least one isoolefin monomer; and, repeating units derived from at least one multiolefin monomer, wherein the composition comprises a surface with an organosilane self-assembled monolayer According to another aspect of the present invention, there is provided A process for increasing the impermeability of a butyl rubber composition comprising: providing a butyl rubber polymer comprising repeating units derived from at least one isoolefin monomer and repeating units derived from one or more multiolefin monomers; oxidizing a surface of the butyl rubber; treating the surface with an alcohol and allowing the alcohol to evaporate; exposing the treated surface to a silicon halide; and, reacting the silicon halide exposed surface with an organotrichlorosilane vapour deposited on the surface under conditions suitable to form a self-assembled monolayer.

Further aspects of the invention will be apparent to those of skill in the art with reference to the following description.

BRIEF DESCRIPTION OF THE DRAWINGS

In order that the invention may be more clearly understood, preferred embodiments thereof will now be described with reference to the accompanying figures, in which.

DETAILED DESCRIPTION

The butyl rubber ionomer is prepared from a halogenated butyl rubber polymer. Butyl rubber polymers are generally derived from at least one isoolefin monomer, at least one multiolefin monomer and optionally further copolymerizable monomers.

In one embodiment, the ionomer may comprise repeating units derived from an isoolefin monomer and a conjugated diene monomer. In another embodiment, the butyl ionomer may comprise repeating units derived from an isoolefin monomer, a conjugated diene monomer and a styrenic monomer.

The butyl rubber polymer is not limited to a specific isoolefin. Any isoolefin, as known to those of skill in the art, are contemplated by the present invention including isoolefins having, for examples, within the range of from 4 to 16 carbon atoms. In one embodiment of the present invention, isoolefins having from 4-7 carbon atoms are contemplated. Examples of isoolefins for use in the present invention include isobutene, 2-methyl-1-butene, 3-methyl-1-butene, 2-methyl-2-butene, 4-methyl-1-pentene and mixtures. A preferred isoolefin is isobutene (isobutylene).

Similarly, the butyl rubber polymer is not limited to a specific multiolefin. Multiolefins copolymerizable with the isoolefins, as known to one skilled in the art, can be used in the practice of the present invention. Conjugated diene multiolefin monomers are preferred. Examples of such multiolefins include, for example, those having in the range of from 4-14 carbon atoms. Examples of suitable multiolefins include isoprene, butadiene, 2-methylbutadiene, 2,4-dimethylbutadiene, piperyline, 3-methyl-1,3-pentadiene, 2,4-hexadiene, 2-neopentylbutadiene, 2-methyl-1,5-hexadiene, 2,5-dimethyl-2,4-hexadiene, 2-methyl-1,4-pentadiene, 2-methyl-1,6-heptadiene, cyclopentadiene, methylcyclopentadiene, cyclohexadiene, 1-vinyl-cyclohexadiene and mixtures thereof. A preferred multiolefin comprises isoprene.

The butyl rubber useful in the present invention may include a co-monomer other than the above referenced multiolefins, such as an alkyl-substituted vinyl aromatic co-monomer, including but not limited to a C$_1$-C$_4$ alkyl substituted styrene. Specific examples of such co-monomers include, for example, a-methyl styrene, p-methyl styrene, chlorostyrene, cyclopentadiene and methylcyclopentadiene. In this embodiment of the present invention, the butyl rubber polymer may include, for example, random copolymers of isobutylene, isoprene and para-methylstryene.

Once the butyl rubber polymer is formed from the monomer mixture, the butyl rubber polymer may be subjected to a halogenation process in order to form the halogenated butyl rubber polymer or halobutyl rubber polymer. Bromination or chlorination can be performed according to the process known by those skilled in the art, for example, the procedures described in Rubber Technology, 3rd Ed., Edited by Maurice Morton, Kluwer Academic Publishers, pp. 297-300 and further documents cited therein.

In one embodiment, a halogenated butyl rubber for use in the present invention includes a halogenated butyl rubber having isobutylene and less than 2.2 mol % isoprene, which is commercially available from LANXESS Deutschland GmbH and sold under the name BB2030™.

During halogenation, some or all of the multiolefin content of the butyl polymer is converted to allylic halides. The allylic halides in the halobutyl polymer are therefore repeating units derived from the multiolefin monomers originally present in the butyl polymer. The total allylic halide content of the halobutyl polymer cannot exceed the starting multiolefin content of the parent butyl polymer. In one embodiment, 0.5-2.5 mol % multiolefins may be present in the butyl rubber prior to the halogenation of the multiolefins.

The allylic halide sites of the halobutyl polymer can then be reacted with at least one nitrogen or phosphorus containing nucleophile according to the following formula, wherein:
A is nitrogen or phosphorus; and,
R$_1$, R$_2$ and R$_3$ are independently selected and comprise: linear or branched C$_1$-C$_{18}$ alkyl substituents; an aryl substituent which is monocyclic or composed of fused C$_4$-C$_8$ rings; or, combinations thereof, wherein at least one of R$_1$, R$_2$ or R$_3$ contains a pendant vinyl group.

In general, the appropriate nucleophile will contain at least one neutral phosphorus or nitrogen center which possesses a lone pair of electrons which is both electronically and sterically accessible for participation in nucleophilic substitution reactions.

In one embodiment, the nitrogen or phosphorus based nucleophile comprises a pendant vinyl group. Suitable nucleophiles include but are not limited to diphenylphosphinostyrene (DPPS), allyldiphenylphosphine, diallylphenylphosphine, diphenylvinylphosphine, triallylphenylphosphine, N-vinyl caprolactam, N-vinyl phthalimide, 9-vinyl carbazole, N-[3-(dimethylamino)propyl]methacrylamide, diphenylvinylphosphin-methyl-N-vinylacetamide, N-allyl-N-butyl-2-propen-1-amine, 1-vinyl-2-pyrrolidone, 2-isopropenyl-2-oxazoline, 2-vinylpyrid-4-vinylpyridine, N-ethyl-2-vinylcarbazole or mixtures thereof.

One example of a nucleophile that is particularly useful is diphenylphosphinostyrene (DPPS), shown below.

Figure 2:
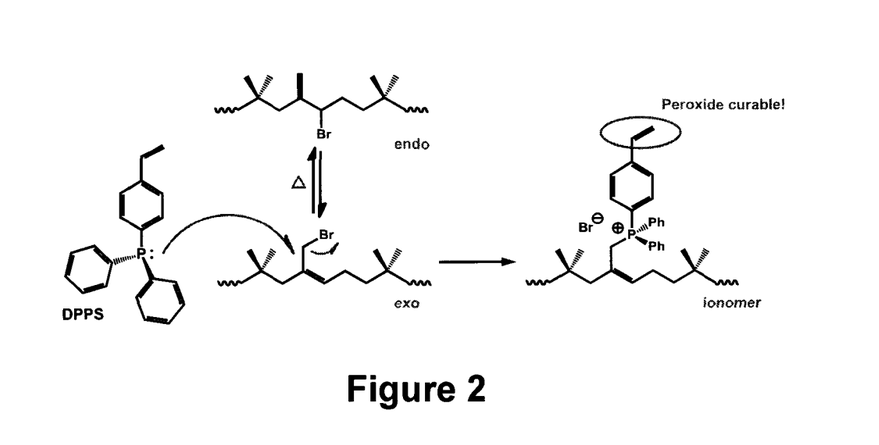
FIG. 2 is a reaction mechanism for the formation of BB2030-DPPS butyl rubber.
Figure 3:
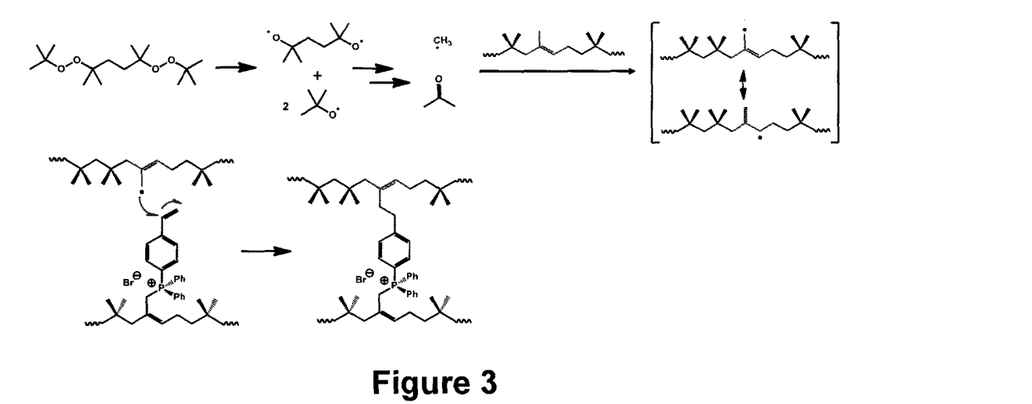
FIG. 3 is a reaction mechanism for peroxide cure of BB2030-DPPS butyl rubber.

When reacted with halogenated butyl rubber containing allylic halides produced at the multiolefin sites of the starting polymer, the reaction product produces a butyl rubber ionomer having unsaturation at the pendant vinyl sites. This unsaturation is in addition to any residual unsaturation remaining in the halogenated butyl rubber starting material. Unsaturation allows peroxide curability of the ionomer, without the molecular weight degradation and chain scission that normally occurs when insufficient olefinic bonds are present. The reaction process is pictured in FIG. 2.

The amount of nucleophile reacted with the butyl rubber may be in the range of from 0.05 to 5 molar equivalents, more preferably 0.5 to 4 molar equivalents and even more preferably 1 to 3 molar equivalents based on the total molar amount of allylic halide present in the halobutyl polymer.

The halobutyl polymer and the nucleophile can be reacted for about 0.25 to 90 minutes. When the reaction takes place in an internal mixer the reaction is preferably between 1 to 90 minutes, more preferably from 1 to 60 minutes, at a temperature of greater than 80° C., such as from 80 to 180° C.

Since the nucleophile reacts with the allylic halide functionality of the halobutyl polymer, the resulting ionomeric moiety is a repeating unit derived from an allylic halide. The total content of ionomeric moiety in the butyl ionomer therefore cannot exceed the starting amount of allylic halide in the halobutyl polymer; however, residual allylic halides and/or residual multiolefins may be present. The resulting halobutyl based ionomer preferably possesses at least 0.05 mol %, preferably at least 0.75 mol %, more preferably at least 1.0 mol % of the ionomeric moiety up to an amount not exceeding the original allylic halide content of the halobutyl polymer used to produce the butyl ionomer. Residual allylic halides may be present in a non-zero amount up to an amount not exceeding the original allylic halide content of the halobutyl polymer used to produce the butyl ionomer. Residual multiolefin may be present in a non-zero amount up to an amount not exceeding the original multiolefin content of the butyl polymer used to produce the halobutyl polymer.

In some embodiments, in order to preserve optical transparency, it is desirable that no fillers are employed in the compounds of the present invention. These filler free compounds must therefore possess the necessary physical properties when cured, without the benefit of filler re-inforcement. However, in other embodiments, it is possible to employ certain optically transparent fillers to enhance the physical properties of the final cured compounds. Examples of suitable optically transparent fillers that may be used include Aerosil® transparent fumed silica and similar products available under alternative tradenames.

In one embodiment, the butyl rubber previously described is surface modified in order to form a self-assembled monolayer (SAM). In one embodiment, the butyl rubber surface is subjected to plasma oxidation and removal of oxidized scission products to create a low density of useful functional groups (—OH, —COOH) on the surface; these groups then anchor a surface silicate layer by the adsorption and hydrolysis of $SiCl_4$. This procedure creates a dense array of Si—OH surface groups, which are available to react with an organotrichlorosilane vapour to form an organosilane SAM on the surface. It has been shown experimentally that SAMs formed from organotrichlorosilanes, for example perfluorooctyltrichlorosilane (FOTS), reduce the permeation rate of oxygen by up to 25% relative to unmodified butyl rubber substrates, or from 15-25%. Unfilled SAM compositions desirably exhibit a permeability to oxygen of less than 200 cc-mm/($m^2$-day), less than 190 cc-mm/($m^2$-day), less than 175 cc-mm/($m^2$-day), or in the range of from 168 to 200 cc-mm/($m^2$-day). Filled SAM compositions desirably exhibit a permeability to oxygen of less than 170 cc-mm/($m^2$-day), less than 160 cc-mm/($m^2$-day), less than 140 cc-mm/($m^2$-day), less than 130 cc-mm/($m^2$-day), less than 120 cc-mm/($m^2$-day), less than 110 cc-mm/($m^2$-day), less than 100 cc-mm/($m^2$-day) or in the range of from 90 to 166 cc-mm/($m^2$-day).

A process for increasing the impermeability of the butyl rubber composition comprises oxidizing a surface of the butyl rubber. The surface may be oxidized using a variety of methods. A suitable method employs an oxygen containing plasma, for example an RF plasma. The butyl rubber may be treated with oxygen containing RF plasma for from 1 to 30 minutes, or from 10 to 20 minutes in a suitable plasma treatment apparatus, for example a Harrick plasma cleaner (Model: PDC-001). Other suitable methods will be known to persons of skill in the art.

Although treatment with RF plasma has been known to cause damage to butyl rubber surfaces, the products of RF plasma induced bond scission reactions may be removed by treating the plasma treated surface with an alcohol, for example isopropanol. One method of treating the surface with alcohol comprises swabbing the surface with the alcohol. Other suitable methods may comprise dipping or bathing the surface in the alcohol. Following treatment, the alcohol may be permitted to evaporate, thereby exposing a surface with enough oxidized butyl rubber functionalities to provide anchoring for a subsequent SAM layer.

After alcohol treatment, the butyl rubber surface may be exposed to a silicon halide. The silicon halide may comprise a silicon tetrahalide, for example silicon tetrachloride ($SiCl_4$). The silicon halide is absorbed by the hydroxyl functional groups on the treated butyl rubber surface. The silicon halide is then hydrolyzed to create a dense array of SiOH surface groups on the butyl rubber. The exposure time for the silicon halide may be on the order of from 1 to 180 seconds, from 10 to 90 seconds or from 15 to 60 seconds. The surface groups are then available to further react with an organosilane, for example an organotrichlorosilane, to form the SAM.

The organotrichlorosilane may be deposited on the silicon halide exposed butyl rubber surface via a variety of means. An example of a suitable deposition method is physical vapor deposition (PVD). Examples of suitable organotrichlorosilanes comprise trichloro(1H,1H,2H,2H-perfluorooctyl)silane (FOTS), n-octadecyltrichlorosilane (OTS), or a combination thereof.

The presence of the pendant vinyl group makes compounds according to the present invention suitable for peroxide curing, despite the lack of high levels of residual multiolefin content previously thought necessary to allow peroxide curing without undue chain scission and molecular weight degradation.

Peroxide based curing systems suitable for use in the present invention may comprise a peroxide curing agent, for example, dicumyl peroxide, di-tert-butyl peroxide, benzoyl peroxide, 2,2'-bis(tert.-butylperoxy)diisopropylbenzene (Vulcup® 40KE), benzoyl peroxide, 2,5-dimethyl-2,5-di(tert-butylperoxy)-hexyne-3,2,5-dimethyl-2,5-di(benzoylperoxy)hexane, (2,5-bis(tert.-butylperoxy)-2,5-dimethyl hexane and the like. One such peroxide curing agent comprises dicumyl peroxide and is commercially available under the name DiCup 40C™. Another peroxide curing agent is 2,5-bis(tert.-butylperoxy)-2,5-dimethyl hexane commercially available under the name Trigonox 101-45B-PD-AM. In one embodiment, the peroxide curing agent is used in an amount of 0.1 to 7 parts per hundred parts of rubber (phr). In another embodiment, the peroxide curing agent is used in an amount of 0.3 to 6 phr. In yet another embodiment, the peroxide curing agent is used in an amount of about 4 phr.

Peroxide curing co-agents can also be used in the present invention. Suitable peroxide curing co-agents include, for example, triallyl isocyanurate (TAIC), commercially available under the name DIAK 7™ from DuPont, N,N'-m-phenylene dimaleimide, known as HVA-2™ (DuPont Dow), triallyl cyanurate (TAC) or liquid polybutadiene known as Ricon D 153™ (supplied by Ricon Resins). Peroxide curing co-agents may be used in amounts equivalent to those of the peroxide curing agent, or less.

Curing of the composition can be effected by providing conditions suitable for curing the peroxide curing agent, for example an elevated temperature in the range of from 80 to 250° C., preferably 100 to 200° C., more preferably 120 to 170° C.

The state of peroxide cured compositions is enhanced with butyl polymers containing increased levels of unsaturation. This can be achieved with polymers having elevated levels of multiolefin content in the polymer backbone or through addition of increased unsaturation attributable to the pendant vinyl groups of the phosphorus or nitrogen based nucleophile. Total unsaturation levels exceeding 0.5 mol %, or greater than 1.0 mol %, lead to desirably enhanced cure states. By using as starting materials butyl rubber polymers with elevated levels of isoprene, for example in excess of 3.5 mol %, in the polymer backbone, enhanced cure states can be achieved.

In one embodiment, a peroxide cured butyl rubber compound comprises a cure state $M_H$-$M_L$ greater than 4.5 dNm, greater than 5.3 dNm, greater than 6.3 dNm, greater than 11.9 dNm or from 4 to 15 dNm.

In one embodiment, it is desirable that the compositions according to the invention are optically transparent. This may be characterized as a transmittance of greater than or equal to 65% of visible light of a wavelength selected from 350 to 750 nm at a thickness of 0.51 mm or less. For example, cured compositions of the present invention may exhibit an optical transparency of greater than or equal to 75% at a thickness of 0.51 mm for a wavelength of 630 nm, preferably greater than or equal to 80%, more preferably greater than or equal to 83% or within the range of from 83% to 99.9%, 83% to 99%, 83 to 95% or 83 to 92%. Persons of skill in the art may readily convert these ranges of transmittance values to absorption co-efficients using Beer's law and a thickness of 0.51 mm.

It is also desirable that the compositions according to the present invention exhibit low surface tackiness in order to enable them to be handled, processed and ultimately used in a variety of applications.

A combination of some or all of the foregoing physical, rheological, permeability, transparency and tackiness properties is desirable to form a cured composition useful in a variety of applications.

In some embodiments of the present invention, stabilizers, anti-oxidants, tackifiers, and/or other additives as known to those of skill in the art may also be added. However, it is important that these additives are chosen and/or added in an amount consistent with preserving the optical transparency of the material.

In embodiments where the composition includes the ionomer, curing agents, and/or other additives, the ingredients may be compounded together using conventional compounding techniques. Suitable compounding techniques include, for example, mixing the ingredients of the composite together using, for example, an internal mixer, such as a Banbury mixer, a miniature internal mixer, such as a Haake or Brabender mixer, or a two roll mill mixer. An extruder also provides good mixing, and permits shorter mixing times. It is possible to carry out the mixing in two or more stages, and the mixing can be done in different apparatus, for example one stage in an internal mixer and one stage in an extruder. For further information on compounding techniques, see Encyclopedia of Polymer Science and Engineering, Vol. 4, p. 66 et seq. (Compounding). Other techniques, as known to those of skill in the art, are further suitable for compounding. Additionally, fillers, curing agents, and/or other additives may be added to the ionomer. Peroxide cured articles may be made from the compounds of the present invention in the form of coatings or encapsulants for optoelectronic devices, such as LED's, fiber optics, opto-electronic couplers, etc.

In one embodiment of the process for producing peroxide cured compounds, it is desirable to first admix the nucleophile comprising a pendant vinyl group with the halogenated butyl rubber, then to peroxide cure by admixing it with a peroxide curing agent. This method often produces rubber with an elevated state of cure, but at the expense of reduced optical transparency due to a "nervy" texture generated from ionomer formation. In other embodiments, it is desirable to form peroxide cured compounds by admixing the halogenated butyl rubber with both the nucleophile comprising the pendant vinyl group and the peroxide curing agent, to thereby form the ionomer in situ during curing of the compound. This process is simpler from a process point of view, in that it requires only a single step to lead to enhanced states of peroxide cure of halogenated butyl rubber grades with insufficient diene levels in the backbone to otherwise permit peroxide curability. However, the in situ process can also be used with halogenated butyl rubber grades having elevated levels of isoprene in the backbone, in order to produce cured compounds having desirably elevated cure states and short cure times. Cured compounds produced in situ desirably have at least comparable cure states, and may have enhanced cure states, as compared with compounds produced in a multi-step process. They also exhibit decreased optical transparency due to the resulting "nervy" texture.

It is desirable that the composition according to the present invention have a low surface roughness in order to increase optical transparency. The root mean squared (RMS) surface roughness of the cured compositions of the present invention may be in the range of from 0.1-100 nm, preferably 0.1-50 nm, more preferably 0.1-10 nm. An RMS surface roughness in the range of 0.1-10 nm may be characterized as an ultra-smooth surface.

In order to obtain an ultra-smooth surface, molding surfaces of the present invention may be coated with a release agent comprising, for example poly(dimethyl)siloxane, (PDMS). PDMS is electrically non-conductive and optically transparent, although it exhibits poor impermeability to gases, which can lead to oxidation of encapsulated electronics or coated electrodes. PDMS may be applied to a mold surface by a variety of known techniques, such as spin coating. Surfaces may also be coated with Teflon® to obtain a less smooth surface that is still adequate for some embodiments of the invention. A combination of Teflon® and PDMS may also be applied so that the PDMS layer can be more readily removed from the mold surface. This can advantageously allow for recycling of the PDMS in certain applications. In one embodiment, the mold surfaces further comprise silicon wafers as a substrate for the PDMS or Teflon®/PDMS coatings.

The mold may be heated to effect curing of the mixed compound. For example, the mold may be heated to a temperature of from 100 to 200° C., from 130 to 180° C. or about 175° C. The molding process may take place from 1 to 10 minutes, preferably from 4 to 8 minutes. It is desirable that the molding process not be conducted for an overly long period of time to avoid scorching the ionomer, thereby decreasing its optical transparency.

Highly transparent butyl rubber cured articles with increased oxygen impermeability are useful in a number of application areas, such as stretchable/flexible electronics, solar cells, encapsulated materials and thin films.

EXAMPLES

Bromobutyl 2030™ is a commercial product of LANXESS Inc. and RB70 was an experimental trial product (polyisobutylene-co-isoprene with an isoprene content of 6.9% made via the slurry polymerization process). The remaining materials were used as received: p-styryldiphenylphosphine (DPPS) (Hokko Chemical Industry), Trigonox™ 101-45B-PD-AM (Akzo Nobel), Sylgard-184™ PDMS poly(dimethylsiloxane) (Aldrich), 3" Silicon wafers (University Wafer), trichloro(1H,1H,2H,2H-perfluorooctyl) silane (FOTS) (Aldrich) and n-octadecyltrichlorosilane (OTS) (Aldrich). ACS grade water was used for water contact angle measurements.

The polymer was added to a Brabender™ internal mixer equipped with high shear (roller) blades at 60° C. and 60 rpm. The rubber was masticated alone for 60 seconds followed by addition of DPPS. The peroxide was added after 4 minutes of mixing and mixture dumped after 6 minutes. Once all the ingredients were incorporated, the compound was refined with 6×¾ inch cuts and 6 endwise passes. Mixing the white- and black-filled formulations followed a similar procedure but with the filler being added after the rubber was masticated. The formulations for the unfilled, white and black filled butyl rubber are described in Table 1.

TABLE 1

Butyl rubber formulations for unfilled, white and black-filled butyl rubber

| Ingredient (PHR) | 11YR035 (unfilled) | 11YR068 (white-filled) | 11YR034 (white-filled) | 11YR037 (black-filled) |
|---|---|---|---|---|
| BB2030 | 100 | 100 | — | 100 |
| RB70 | — | — | 100 | — |
| DPPS | 5 | — | — | — |
| Trigonox 101-45B-PD-AM | 0.3 | — | 5 | — |
| Hi Sil 532 EP | — | — | 15 | — |
| Mistron vapor talc | — | — | 45 | — |
| SR 519HP | — | — | 5 | — |
| Calcined clay satintone | — | 80 | — | — |
| Polyethylene AC-617A | — | 2 | — | — |
| Zinc oxide (Kardox 920) | — | 3 | — | 3 |
| Vulkacit LDA | — | 0.2 | — | — |
| Carbon black (N660) | — | — | — | 50 |
| Stearic acid (triple pressed) | — | — | — | 1 |
| Vulkacit DM/C | — | — | — | 1 |
| Sulfur NBS | — | — | — | 0.5 |

MDR

The t90 and delta torques were determined according to ASTM D-5289 with the use of a Moving Die Rheometer (MDR 2000E) using a frequency of oscillation of 1.7 Hz and a 1° arc for 30 minutes total run time, at 175° C. for unfilled and 160° C. for all other filled formulations. The rheological results are tabulated in Table 2.

TABLE 2

Rheological testing results for unfilled, white and black-filled formulations using MDR

| MDR results | 11YR035 (unfilled) | 11YR068 (white-filled) | 11YR034 (white-filled) | 11YR037 (black-filled) |
|---|---|---|---|---|
| MH (dNm) | 13.3 | 7.8 | 6.4 | 9.8 |
| ML (dNm) | 1.3 | 2.5 | 1.7 | 3.5 |
| MH − ML (dNm) | 11.9 | 5.3 | 4.7 | 6.3 |
| ts2 (min) | 1.1 | 2.5 | 0.6 | 2.9 |
| t90 (min) | 7.9 | 4.7 | 1.2 | 7.3 |

Unfilled butyl rubber (U-IIR) substrates were prepared by molding freshly milled BB2030-DPPS rubber between two silicon wafers coated with poly(dimethylsiloxane) (PDMS), which acted as a release layer.

The silicon wafers (3" diameter) were first cleaned in Piranha solution (a 7:3 (v/v) mixture of 98% $H_2SO_4$ and 30% $H_2O_2$) for 5 min, followed by rinsing in deionized water and drying on a 120° C. hotplate. Sylgard-184™ PDMS prepolymer was then spin-coated on the wafer surface at 3000 RPM for 50 s. The PDMS coating was cured in a 60° C. oven overnight.

Preparation of Unfilled Butyl Rubber (U-IIR) Substrates

Figure 4A:
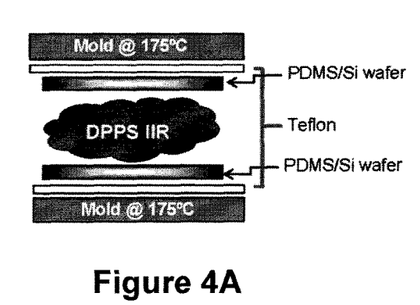
FIG. 4A shows a schematic of sample preparation for cure of unfilled butyl rubber sheets against PDMS coated wafer between sheets of Teflon.

U-IIR rubber substrates were prepared by molding the BB2030-DPPS butyl rubber formulation between two PDMS-coated silicon wafers: 10 g of freshly compounded BB2030-DPPS was placed in a ½ macro mold with 2 mm thickness between the two PDMS-coated silicon wafers and one Teflon sheet (0.26 mm thick) on either side of the wafers. The mold was placed in a manual carver press (model 3853-0) equipped with a temperature control with platens temperature set to 175° C., under 20 tons of pressure. This was cured at 175° C. for 8 min. (FIG. 4A). The wafers were removed from the rubber sheets while still hot providing ultra-smooth rubber sheets (~0.4 mm thick).

Preparation of Filled-IIR Substrates

Figure 4B:
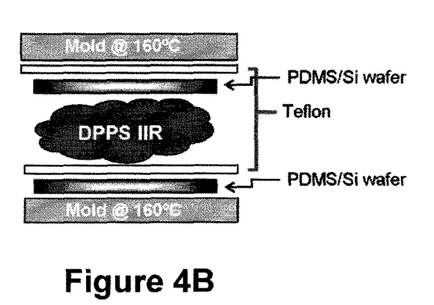
FIG. 4B shows a schematic of sample preparation for cure of filled butyl rubber sheets against PDMS coated wafer on one side with sheets of Teflon.

The white- and black-filled IIR substrates were prepared in the same manner mentioned above, except that the butyl sheets were cured directly against the PDMS coated wafer on one side only. These butyl sheets only require a smooth surface on one side and this allows the re-use of wafers (FIG. 4B). Both white-filled and black-filled formulations were cured at 160° C. for t90+5 minutes.

Oxidation of IIR Substrates

IIR substrates (~0.5 mm thick, 6.0×6.0 $cm^2$), were cleaned by sonication in acetone and isopropanol for 10 min each in a Branson™ sonicator (Model 3510), and then treated with oxygen plasma for 15 min in a Harrick™ plasma cleaner (Model: PDC-001) at $O_2$ pressure of 10 psig and flow rate of 10.6 mL·$min^{-1}$ at medium discharge setting. The oxidized samples were then gently swabbed with isopropyl alcohol, and dried in a stream of nitrogen.

Silicon Tetrachloride Treatment

The oxidized IIR samples were attached to a glass slide and suspended face down over a glass petri dish containing 0.1 mL of silicon tetrachloride for 30 s at room temperature under ambient conditions. The samples were then soaked in distilled water for 10 min, and dried in a stream of nitrogen.

Fabrication of SAMs on IIR Substrates

SAMs of trichloro(1H,1H,2H,2H-perfluorooctyl)silane (FOTS) and n-octadecyltrichlorosilane (OTS) were deposited on $SiCl_4$-modified butyl rubber samples by physical vapour deposition (PVD). The samples were suspended upside down over a 250 mL beaker containing 3-5 drops of organosilane in a vacuum desiccator for approximately 20 h.

Contact Angle Measurements

Water contact angles were measured using the sessile drop method on a Ramé-Hart™ (Model: 100-25-M) contact angle goniometer. At least four drops from three samples were averaged.

Fourier Transform Infrared Spectroscopy

Attenuated Total Reflectance (FTIR-ATR) FTIR-ATR spectra were collected using a Bruker™ IFS 66/v spectrometer equipped with a DTGS detector. The p-polarized light was incident at 45° from the surface normal. For each sample, 2048 scans were collected at a resolution of 4 $cm^{-1}$ using a ZnSe crystal.

Permeability Measurements

Permeability of the surface-modified butyl rubber samples to oxygen was quantified using a Mocon Ox-Tran™ Model 2/61 permeation test system. The thickness of the samples was first measured at five points. Samples were discarded if thickness differences between any of these five points differed by >25%. The samples were preconditioned with oxygen for 10 hours in the instrument prior to permeation measurements. Oxygen permeation was measured at 40° C. and 0% relative humidity over over 3 to 5 twenty min. cycles to determine the oxygen transmission rate (in cc/[$m^2$·day]) through the sample and the permeation rate (in cc·mm/[$m^2$·day]). A minimum of three samples of each type were measured.

Results

Oxidation of Unfilled U-IIR Surfaces

Figure 5:
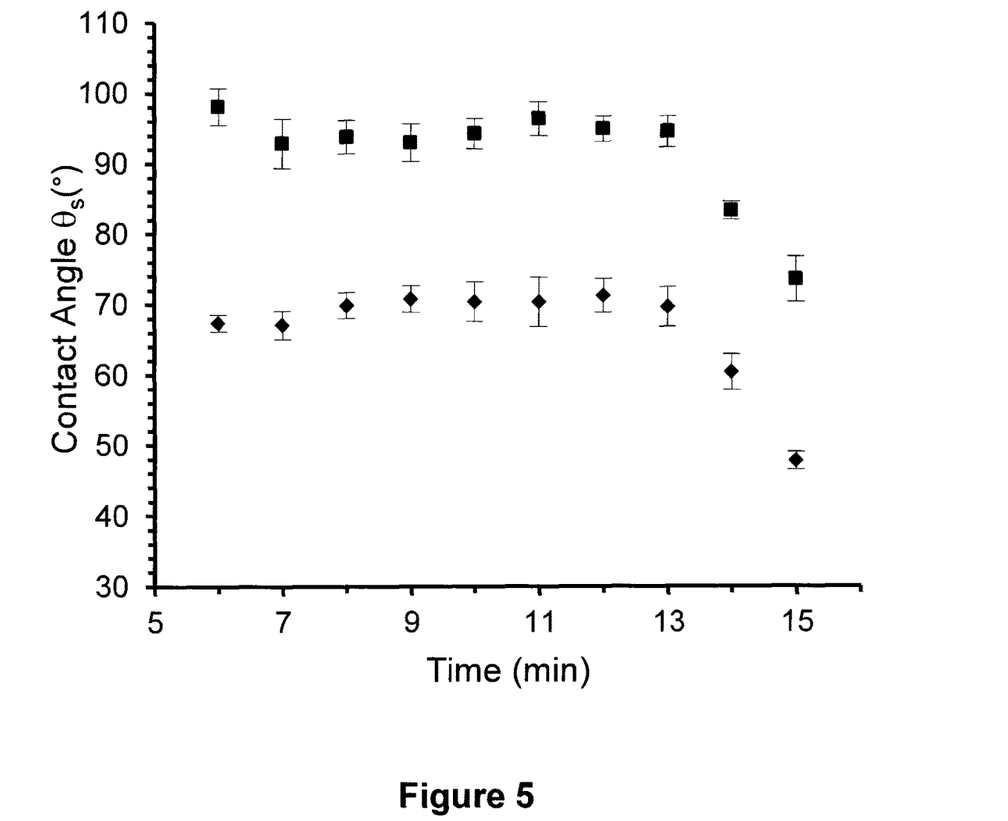
FIG. 5 shows static water contact angles of oxidized U-IIR substrates (diamonds) and oxidized U-IIR substrates swabbed with isopropanol (squares) as a function of exposure time to rf oxygen plasma.

The contact angle of water on U-IIR is 95.5°, indicating that U-IIR is a naturally hydrophobic surface lacking polar functional groups (Table 3). The formation of an alkyl-trichlorosilane SAM on the surface, however, benefits from the presence of hydroxyl or carboxylic acid functional groups, which undergo condensation reactions with silanol groups of the hydrolyzed alkyltrichlorosilane, anchoring it to the surface. U-IIR surfaces were exposed to oxygen plasma for times ranging from 6 to 15 minutes and monitored for the hydrophilicity of the surface by measuring water contact angles (FIG. 5). Although treatment of U-IIR with oxygen plasma for times ranging from 6 to 13 minutes initially reduces the water contact angle to ~68° (indicating that oxidation has occurred), this reduction in contact angle is due to the oxidized products of bond scission physisorbed on the surface. This layer of oxidized products can easily be removed by swabbing the surface with isopropanol, revealing the underlying surface with a contact angle of ~95°, similar to the starting value. Increasing the oxidation time to 15 minutes, however, chemically changes the underlying surface. After 15 minutes of plasma oxidation, the contact angle falls to 48.0°. After removing the oxidized scission products, it increases to 74.6°, ~20° lower than the initial value. This modified U-IIR surface is designated U-IIR$_{[ox]}$. The contact angle of U-IIR$_{[ox]}$ is consistent with the presence of polar groups at the surface, albeit in low density, that are likely a heterogeneous mixture of oxidized functional groups (—OH, —COOH, ketone) (FIG. 1). The ATR-FTIR spectrum of U-IIR$_{[ox]}$ appears unchanged compared to the spectrum of native U-IIR (FIG. 6), consistent with the low surface density of oxidized groups indicated by the contact angle. Although peaks due to carbonyl group stretching were not detectable, the slight increase in intensity of the broad peak in the region of 3100-3550 $cm^{-1}$ (which corresponds to O—H stretching vibrations) could be due to the introduction of surface hydroxyl groups; however, the broadness of the O—H stretching region and possible differences in the amount of physisorbed water on the surface makes intensity comparisons unreliable.

TABLE 3

Static water contact angles on unfilled U-IIR surfaces measured using the sessile drop method.

| Material | θ ($H_2O$) (°) |
|---|---|
| Native U-IIR | 95.5 ± 2.3 |
| Plasma oxidized U-IIR | 47.8 ± 3.2 |
| U-IIR$_{[ox]}$ | 74.6 ± 1.7 |
| U-IIR$_{[ox]}$/$SiO_2$ | <20 |
| U-IIR$_{[ox]}$/$SiO_2$/OTS | 101.2 ± 0.9 |
| U-IIR$_{[ox]}$/$SiO_2$/FOTS | 107.5 ± 2.0 |

Silicate Layer Formation

Figure 6:
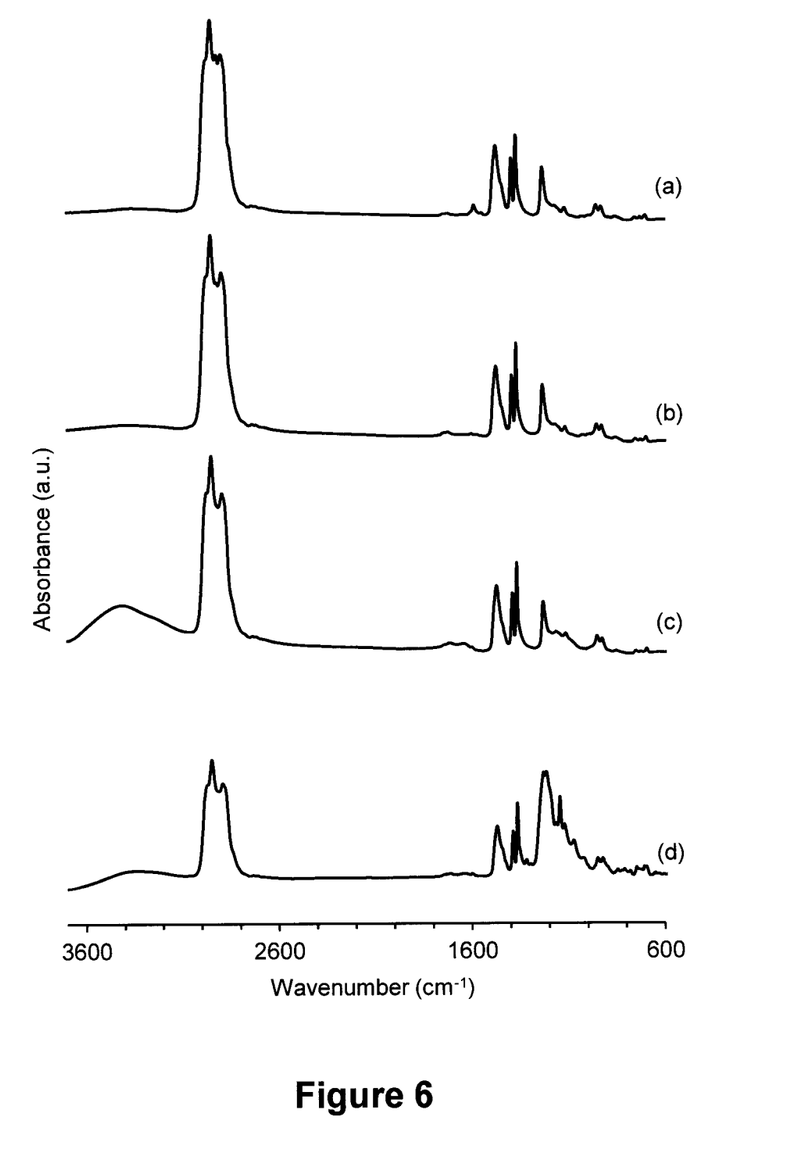
FIG. 6 shows ATR-FTIR spectra of (a) native U-IIR, (b) U-IIR$_{[ox]}$, (c) U-IIR$_{[ox]}$/SiO$_2$, and (d) U-IIR$_{[ox]}$/SiO$_2$/FOTS.

The introduction of a sufficient density of polar functional groups on the U-IIR surface by oxidation is not possible due to chain scission reactions; thus, an additional surface treatment was implemented that was designed to increase the density of surface hydroxyl groups. Treatment of the oxidized/swabbed U-IIR surface with silicon tetrachloride vapour in humid air produces a layer of silicon dioxide on the U-IIR surface by the adsorption and hydrolysis of $SiCl_4$ (FIG. 1). This material is designated U-IIR$_{[ox]}$/$SiO_2$. This procedure effectively increases the density of polar groups on the surface, decreasing the water contact angle to <20°. FTIR-ATR spectra of the modified surfaces show a pronounced, broad peak at 3100-3550 $cm^{-1}$ due to O—H stretching vibrations, consistent with the presence of a hydroxyl-terminated $SiO_2$ layer on the U-IIR$_{[ox]}$/$SiO_2$ surface (FIG. 6c).

Self-Assembled Monolayer (SAM) Formation

Figure 7:
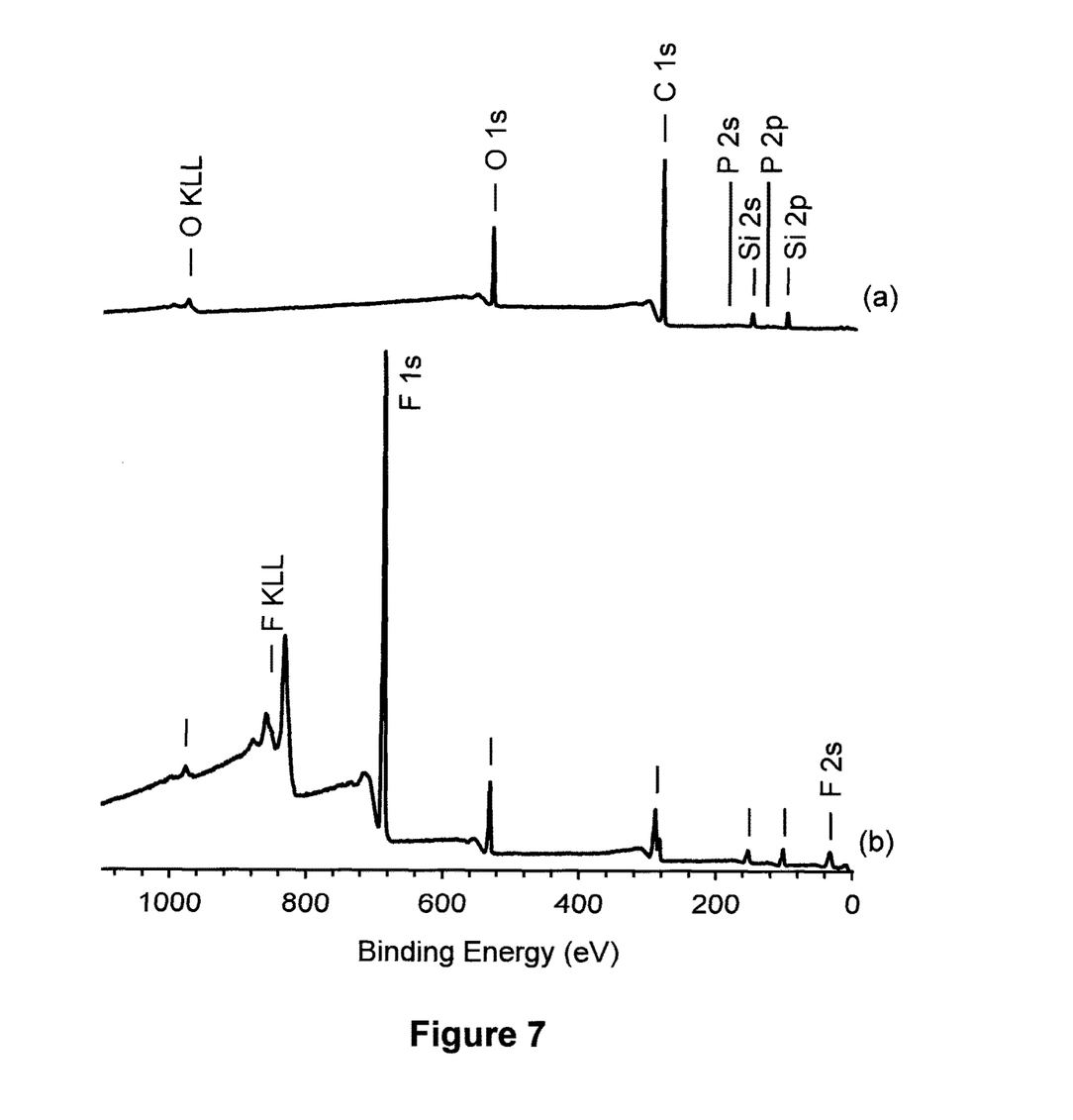
FIG. 7 shows XPS survey scans of (a) U-IIR$_{[ox]}$/SiO$_2$, and (b) U-IIR$_{[ox]}$/SiO$_2$/FOTS.

Exposing U-IIR$_{[ox]}$/$SiO_2$ to a vapour of OTS or FOTS produces a SAM on the U-IIR$_{[ox]}$/$SiO_2$ surface (FIG. 1). Comparison of XPS survey scans of U-IIR$_{[ox]}$/$SiO_2$ (FIG. 7a) and U-IIR$_{[ox]}$/$SiO_2$/FOTS (FIG. 7b) confirms the presence of fluorinated adsorbates on the surface. The survey scan of U-IIR$_{[ox]}$/$SiO_2$ shows peaks due to oxygen, carbon, and phosphorus, consistent with the formulation of U-IIR, along with the 2s and 2p peaks of silicon. The survey scan of U-IIR$_{[ox]}$/$SiO_2$/FOTS showed peaks due to silicon, oxygen, and carbon, as well as the 1s and 2s peaks of fluorine. The absence of peaks due to phosphorus is likely due to attenuation of P 2s and P 2p photoemission by the FOTS overlayer. Water contact angles of U-IIR$_{[ox]}$/$SiO_2$/OTS and U-IIR$_{[ox]}$/$SiO_2$/FOTS surfaces were 101.2° and 107.5°, respectively. The FTIR-ATR spectrum of U-IIR$_{[ox]}$/$SiO_2$/FOTS (FIG. 6d) shows that the signal due to O—H stretching at 3100-3550 $cm^{-1}$ diminishes upon formation of the FOTS SAM, which is due to the reaction of the surface hydroxyl groups with FOTS to form Si—O—Si bonds to the surface. The ATR-FTIR spectrum also shows C—F stretching bands in the region of 1000-1400 $cm^{-1}$, confirming the presence of FOTS molecules on the surface.

Figure 8:
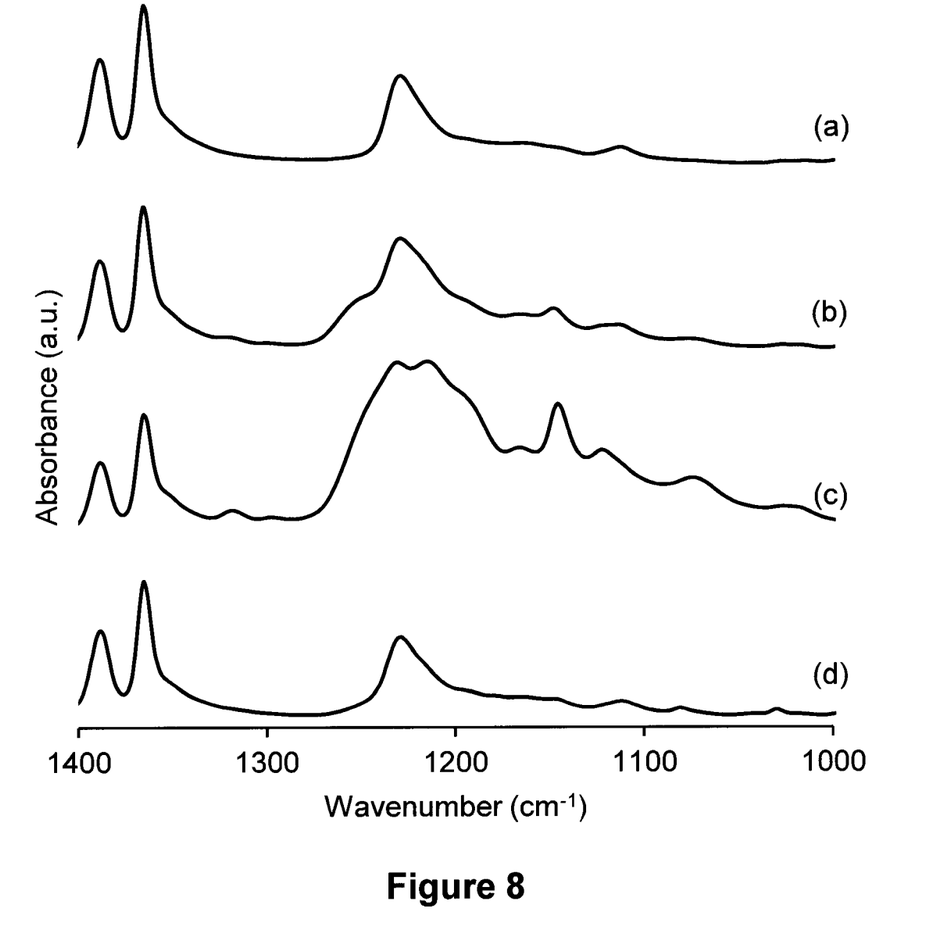
FIG. 8 shows ATR-FTIR spectra (1400-1000 cm$^{-1}$) of (a) U-IIR$_{[ox]}$, (b) U-IIR$_{[ox]}$/FOTS, (c) U-IIR$_{[ox]}$/SiO$_2$/FOTS, and (d) U-IIR$_{[ox]}$/FOTS after rinsing with toluene.

U-IIR$_{[ox]}$ substrates were modified with FOTS to confirm that the $SiO_2$ layer of U-IIR$_{[ox]}$/$SiO_2$ substrates is necessary for the formation of a stable FOTS SAM on the U-IIR surface. The water contact angle of U-IIR$_{[ox]}$/FOTS is 99.8°, and the ATR-FTIR spectrum shows a C—F stretching peak at 1148 cm$^{-1}$. Although this data indicates that FOTS is present on the surface, both the water contact angle and the intensity of the C—F stretching peak for U-IIR$_{[ox]}$/FOTS are significantly lower than those of U-IIR$_{[ox]}$/SiO$_2$/FOTS. FIG. 8a-c shows the 1400-1000 cm$^{-1}$ spectral region of ATR-FTIR spectra of U-IIR$_{[ox]}$, T-IIR$_{[ox]}$/FOTS, and U-IIR$_{[ox]}$/SiO$_2$/FOTS. We compared the stability of the two FOTS layers by rinsing samples of U-IIR$_{[ox]}$/FOTS and U-IIR$_{[ox]}$/SiO$_2$/FOTS with toluene. The peaks due to C—F stretching in the ATR-FTIR spectrum of U-IIR$_{[ox]}$/FOTS disappear (FIG. 8d), indicating that rinsing removes the FOTS layer, whereas the ATR-FTIR spectrum of U-IIR$_{[ox]}$/SiO$_2$/FOTS remains unchanged. The conclusion drawn from this study is that the SiO$_2$ layer anchors the FOTS SAM to the U-IIR$_{[ox]}$ substrate, enabling chemisorption of the FOTS adsorbates. Omitting the SiO$_2$ layer results in the formation of a physisorbed FOTS layer on the U-IIR$_{[ox]}$ substrate that can easily be removed with rinsing.

Permeability Testing

Figure 9:
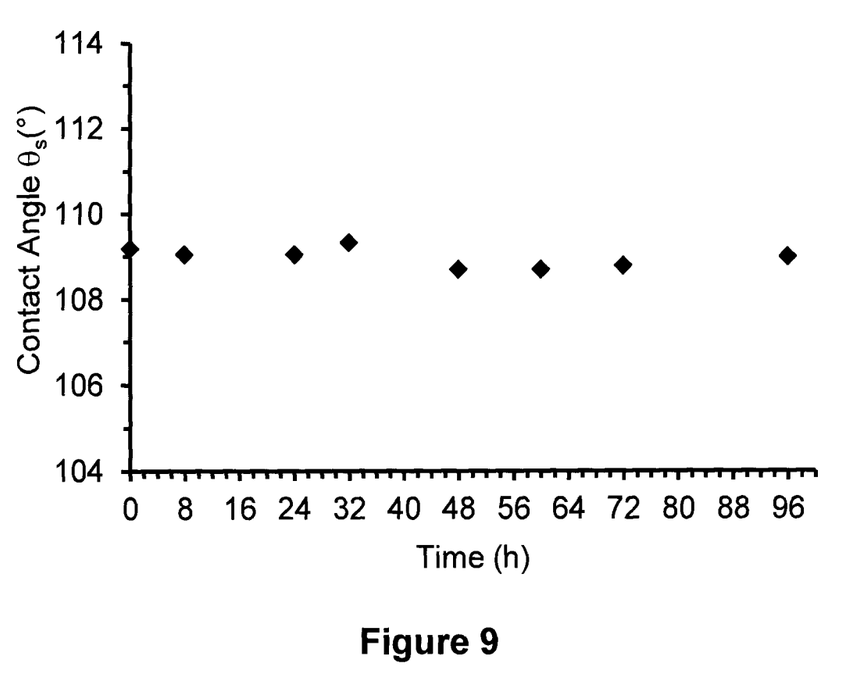
FIG. 9 shows static contact angles of water of U-IIR$_{[ox]}$/SiO$_2$/FOTS as a function of time.

Surface modification of unfilled butyl rubber substrates significantly improves the barrier properties compared to native U-IIR substrates (Table 4). Permeation rates of oxygen through native U-IIR, U-IIR$_{[ox]}$/SiO$_2$/OTS, and U-IIR$_{[ox]}$/SiO$_2$/FOTS substrates were measured. Since permeation rate measurements include 10 hours of conditioning with oxygen and then measurement of oxygen transmission rates over 3 to 5 twenty min. cycles, the stability of the FOTS SAM was tested prior to permeation testing to ensure that the SAM would be stable during the testing duration. Measurements of water contact angles over 96 hours showed no change, indicating that U-IIR$_{[ox]}$/SiO$_2$/FOTS substrates are compatible with the time required for permeation testing (FIG. 9). Compared to native U-IIR samples, the oxygen permeability of U-IIR$_{[ox]}$/SiO$_2$/OTS and U-IIR$_{[ox]}$/SiO$_2$/FOTS decreased by 15% and 25%, respectively. The lower permeability of U-IIR$_{[ox]}$/SiO$_2$/FOTS compared to U-IIR$_{[ox]}$/SiO$_2$/OTS is consistent with the documented ability of surface fluorination to reduce permeability.

TABLE 4

Oxygen permeation rates of unfilled IIR substrates.

| Material | Permeation Rate (cc-mm/(m$^2$-day)) |
|---|---|
| Native U-IIR | 216 ± 4† |
| U-IIR$_{[ox]}$ | 175* |
| U-IIR$_{[ox]}$/SiO$_2$ | 190* |
| U-IIR$_{[ox]}$/SiO$_2$/OTS | 184* |
| U-IIR$_{[ox]}$/SiO$_2$/FOTS | 162 ± 6† |

†Average of three samples
*Measurement of one sample

Various filled butyl rubber substrates were studied to determine if this surface modification process also improved impermeability of these surfaces. Surface modification for the various filled butyl substrates (both white and black-filled) did not show any significant improvement in the barrier properties compared to native butyl substrates (Table 5). Permeation rates of oxygen were measured through native, OTS treated, and FOTS treated substrates. Hence this surface modification method is best applicable to unfilled butyl substrates.

TABLE 5

Oxygen permeation rates of white (W-IIR) and black-filled (B-IIR) IIR substrates

| | Permeation Rate (cc-mm/(m$^2$-day)) | | |
|---|---|---|---|
| Material | Native IIR | IIR$_{[ox]}$/SiO$_2$/OTS | IIR$_{[ox]}$/SiO$_2$/FOTS |
| W-IIR (RB70) | 126.4 ± 5.3 | 118.7 ± 9.1 | 127.5 ± 5.2 |
| W-IIR (BB2030) | 104.2 ± 8.8 | 105.0 ± 7.1 | 99.3 ± 7.4 |
| B-IIR (BB2030) | 138.6 ± 9.9 | 155.6 ± 9.6 | 166.1 ± 6.4 |

Optical Transparency

Figure 10:
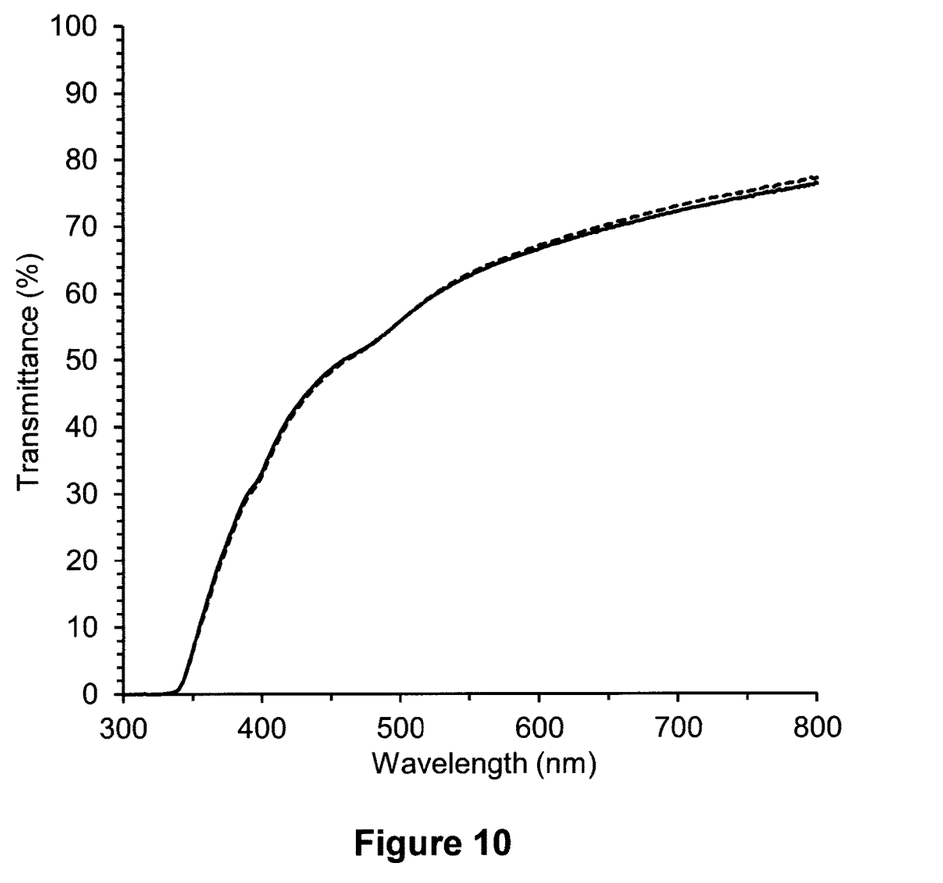
FIG. 10 shows a comparison of transmission spectra of native U-IIR (dashed line) and U-IIR$_{[ox]}$/SiO$_2$/FOTS (solid line)

Transmission spectra of native U-IIR and U-IIR$_{[ox]}$/SiO$_2$/FOTS were compared to quantify the impact of surface treatment on optical transparency. FIG. 10 shows that the transmission spectra of native U-IIR is relatively unchanged when the material is converted to U-IIR$_{[ox]}$/SiO$_2$/FOTS. The surface treatment has a negligible effect on optical transparency, making this method of air permeability reduction especially well-suited to applications that require transparent, impermeable IIR materials.

CONCLUSIONS

A method has been developed to modify the surface of IIR that is based on RF plasma treatment. Consistent with previous reports, RF plasma does damage the IIR surface; however, it has now been shown that the products of RF plasma-induced bond scission reactions can be removed by simply swabbing the IIR surface to reveal a surface with enough oxidized functionalities to anchor an SiO$_2$ layer. In this way, the number of surface hydroxyl groups is increased to support the formation of stable SAMs on the IIR surface. When the SAM is formed from fluorinated adsorbates, a significant reduction in gas permeability of the unfilled IIR substrate to oxygen without compromising optical transparency is observed. Compared to the native U-IIR, samples exhibited a 15% and 25% reduction in oxygen permeation when surface modified with OTS and FOTS, respectively.

Although the invention has been described in detail in the foregoing for purposes of illustration, it is understood that such detail is solely for that purpose and that variations can be made therein by those skilled in the art without departing from the spirit and scope of the invention except as it may be limited by the claims.

What is claimed is:

1. A butyl rubber composition comprising butyl rubber and a self-assembled monolayer of organosilanes disposed on at least one surface of the butyl rubber, the butyl rubber comprising repeating units derived from at least one isoolefin, and repeating units derived from at least one multiolefin.

2. The butyl rubber composition according to claim 1, wherein the self-assembled monolayer of organosilanes comprises organotrichlorosilanes covalently bonded to a surface of the butyl rubber.

3. The butyl rubber composition according to claim 2, wherein the organotrichlorosilanes comprise trichloro(1H, 1H,2H,2H-perfluorooctyl)silane (FOTS), n-octadecyltrichlorosilane (OTS), or a combination thereof.

4. The butyl rubber composition according to claim 2, wherein the isoolefin comprises a $C_4$ to $C_5$ isomonoolefin, and the multiolefin comprises a $C_5$ to $C_{11}$ conjugated aliphatic diene.

5. The butyl rubber composition according to claim 2, wherein the isoolefin is isobutylene, and the multiolefin is isoprene.

6. The butyl rubber composition according to claim 2, wherein the repeating units derived from the at least one multiolefin comprise the reaction product of halogenation of multiolefins, followed by reaction of the halogenated multiolefins and at least one of a nitrogen based nucleophile and a phosphorous based nucleophile.

7. The butyl rubber composition according to claim 6, wherein 0.5-2.5 mol % multiolefins are present in the butyl rubber prior to the halogenation of multiolefins.

8. The butyl rubber composition according to claim 6, wherein the nitrogen based nucleophiles and the phosphorous based nucleophiles comprise a pendant vinyl group.

9. The butyl rubber composition according to claim 6, wherein the at least one of a nitrogen based nucleophile and a phosphorus based nucleophile comprises a nucleophile selected from the group consisting of diphenylphosphinostyrene (DPPS), allyldiphenylphosphine, diallylphenylphosphine, diphenylvinylphosphine, triallylphenylphosphine, N-vinyl caprolactam, N-vinyl phthalimide, 9-vinyl carbazole, N-[3-(dimethylamino)propyl]methacrylamide, diphenylvinylphosphin-methyl-N-vinylacetamide, N-allyl-N-butyl-2-propen-1-amine, 1-vinyl-2-pyrrolidone, 2-isopropenyl-2-oxazoline, 2-vinylpyrid-4-vinylpyridine, N-ethyl-2-vinylcarbazole, and mixtures thereof.

10. The butyl rubber composition according to claim 1, wherein:
the composition has an impermeability to oxygen, and the impermeability to oxygen is 15-25% greater than the impermeability of the butyl rubber without the self-assembled monolayer of organosilanes;
the composition, at a thickness of less than or equal to 0.51 mm, exhibits an optical transparency of at least 75% to a wavelength of 630 nm;
the composition is peroxide cured; and
the composition includes no additional fillers.

11. The butyl rubber composition according to claim 2, wherein:
the organotrichlorosilanes comprise trichloro(1H,1H,2H,2H-perfluorooctyl)silane (FOTS), n-octadecyltrichlorosilane (OTS), or a combination thereof;
the butyl rubber comprises repeating units derived from isobutylene, and repeating units derived from isoprene; and
the repeating units derived from the isoprene comprise the reaction product of halogenation of isoprenes, followed by reaction of the halogenated isoprenes and nucleophiles selected from the group consisting of diphenylphosphinostyrene (DPPS), allyldiphenylphosphine, diallylphenylphosphine, diphenylvinylphosphine, triallyiphenylphosphine, N-vinyl caprolactam, N-vinyl phthalimide, 9-vinyl carbazole, N-[3-(dimethylamino)propyl]methacrylamide, diphenylvinylphosphin-methyl-N-vinylacetamide, N-allyl-N-butyl-2-propen-1-amine, 1-vinyl-2-pyrrolidone, 2-isopropenyl-2-oxazoline, 2-vinylpyrid-4-vinylpyridine, N-ethyl-2-vinylcarbazole, and mixtures thereof.

12. A process for increasing the impermeability of butyl rubber to air, the process comprising:
treating a surface of the butyl rubber to provide a plurality of functional groups on the surface of the butyl rubber; and
reacting the functional groups with organosilanes to form a self-assembled monolayer of organosilanes on the surface of the butyl rubber to form a butyl rubber composition having increased impermeability to air.

13. The process according to claim 12, wherein treating the surface of the butyl rubber comprises:
oxidizing the surface of the butyl rubber to provide a plurality of first functional groups on the surface of the butyl rubber;
reacting the first functional groups with a silicon halide to provide second functional groups on the surface of the butyl rubber; and
reacting the second functional groups with organotrichlorosilanes to form a self-assembled monolayer of organotrichlorosilanes on the surface of the butyl rubber.

14. The process according to claim 13, wherein:
the oxidizing comprises oxidizing the surface of the butyl rubber by an oxygen containing RF plasma; and
reacting the second functional groups with organotrichlorosilanes comprises depositing organotrichlorosilanes on the surface via physical vapour deposition (PVD).

15. The process according to claim 14, wherein:
the butyl rubber comprises repeating units derived from at least one isoolefin monomer and repeating units derived from at least one multiolefin monomer;
the silicon halide is a silicon tetrahalide; and
the organotrichlorosilanes comprise trichloro(1H,1H,2H,2H-perfluorooctyl)silane (FOTS), n-octadecyltrichlorosilane (OTS), or a combination thereof.

16. The process according to claim 13, wherein the process further comprises, prior to oxidizing the surface:
halogenating the butyl rubber to form an allylic halogen moiety; and
reacting the allylic halogen moiety with at least one of a nitrogen based nucleophile and a phosphorus based nucleophile to form a peroxide curable butyl rubber ionomer.

17. The process according to claim 16, wherein the nitrogen based nucleophiles and the phosphorus based nucleophiles comprise a pendant vinyl group.

18. The process according to claim 16, wherein:
reacting the allylic halogen moiety with at least one of a nitrogen based nucleophile and a phosphorus based nucleophile comprises admixing a peroxide curing agent with the halogenated butyl rubber and the at least one of the nitrogen based nucleophile and the phosphorus based nucleophile; and
the process further comprises curing the peroxide curable butyl rubber ionomer under suitable conditions for the peroxide curing agent.

19. The process according to claim 18, wherein:
the butyl rubber comprises repeating units derived from isobutylene, and repeating units derived from isoprene;
the silicon halide comprises $SiCl_4$;
the organotrichlorosilanes comprise trichloro(1H,1H,2H,2H-perfluorooctyl)silane (FOTS), n-octadecyltrichiorosilane (OTS), or a combination thereof;
the at least one of the nitrogen based nucleophile and the phosphorus based nucleophile comprise nucleophiles selected from the group consisting of diphenylphosphinostyrene (DPPS), allyldiphenylphosphine, diallylphenylphosphine, diphenylvinylphosphine, triallylphenylphosphine, N-vinyl caprolactam, N-vinyl phthalimide, 9-vinyl carbazole, N-[3-(dimethylamino)propyl]methacrylamide, diphenylvinylphosphin-methyl-N-vinylacetamide, N-allyl-N-butyl-2-propen-1-amine, 1-vinyl-2- pyrrolidone, 2-isopropenyl-2-oxazoline, 2-vinylpyrid-4-vinylpyridine, N-ethyl-2-vinylcarbazole, and mixtures thereof;

the composition, at a thickness of less than or equal to 0.51 mm, exhibits an optical transparency of at least 75% to a wavelength of 630 nm; and the composition has an impermeability to oxygen, and the impermeability to oxygen is 15-25% greater than the impermeability of the butyl rubber without the self-assembled monolayer of organosilanes.

20. A process for increasing the impermeability of butyl rubber to air, the process comprising:

halogenating a butyl rubber comprising repeating units derived from at least one isoolefin monomer and repeating units derived from one or more multiolefin monomer to form an allylic halogen moiety;

reacting the allylic halogen moiety with at least one of a nitrogen based nucleophile having a pendant vinyl group and a phosphorus based nucleophile having a pendant vinyl group in the presence of a peroxide curing agent to form a peroxide curable butyl rubber ionomer;

curing the butyl rubber ionomer; oxidizing a surface of the cured butyl rubber ionomer by an oxygen containing RF plasma to provide a plurality of functional groups on the surface of the butyl rubber;

treating the oxidized surface with an alcohol;

reacting the functional groups with silicon halide to form silicon-OH function groups on the surface of the butyl rubber; and depositing organotrichlorosilanes on the surface via physical vapour deposition (PVD) to react the organotrichlorosilanes with the silicon-OH functional groups and form a self-assembled monolayer of organotrichlorosilanes on the surface of the butyl rubber.

* * * * *